United States Patent

Nishimura et al.

Patent Number: 5,124,602
Date of Patent: Jun. 23, 1992

[54] DC MOTOR UNIT WITH A ROTATIONAL SPEED DETECTOR

[75] Inventors: Toshihiko Nishimura; Masafumi Ohkuma; Teruaki Matsunaga, all of Himeji, Japan

[73] Assignee: Mitsubishi Denki Kabushiki Kaisha, Tokyo, Japan

[21] Appl. No.: 682,274

[22] Filed: Apr. 9, 1991

[30] Foreign Application Priority Data

Apr. 11, 1990 [JP] Japan ................ 2-39284

[51] Int. Cl.$^5$ .............................. H02K 11/00
[52] U.S. Cl. .................... 310/68 B; 310/88; 310/89; 310/91; 310/155
[58] Field of Search .......... 310/68 B, 168, 169, 310/170, 42, 88, 89, 91, 212, 177, 194, 111, 75 R, 155; 324/173, 174

[56] References Cited

U.S. PATENT DOCUMENTS

| | | | |
|---|---|---|---|
| 3,167,676 | 1/1965 | Fuller | 310/91 |
| 3,203,353 | 8/1965 | Ruby | 310/91 |
| 3,967,200 | 6/1978 | Tetsugu et al. | 324/173 |
| 4,750,371 | 6/1988 | Kobayashi et al. | 310/68 B |
| 4,841,187 | 6/1989 | Hauke et al. | 310/88 |
| 4,899,075 | 2/1990 | Hasebe | 310/68 B |
| 4,900,967 | 2/1990 | Amano et al. | 310/91 |
| 4,954,774 | 9/1990 | Richmond | 310/168 |
| 4,970,423 | 11/1990 | Tamae | 310/68 B |
| 4,982,125 | 1/1991 | Shirakawa | 310/88 |
| 5,013,946 | 5/1991 | Sata | 310/68 B |

FOREIGN PATENT DOCUMENTS

| | | | |
|---|---|---|---|
| 0150751 | 11/1980 | Japan | 310/91 |
| 0648084 | 12/1950 | United Kingdom | 310/91 |

Primary Examiner—R. Skudy
Attorney, Agent, or Firm—Sughrue, Mion, Zinn, Macpeak and Seas

[57] ABSTRACT

A d.c. motor unit with a rotational speed detector comprising a d.c. motor (1) having an output end and an idle end, and a rotational speed detector (14) water-tightly attached to the motor output end. The d.c. motor (1) comprises a motor frame (2) including an output end and an idle end, a mounting bracket (9) attached to the output end of the motor frame (2) and a rotary shaft (4) having an idle end rotatably supported by the motor frame (2) and an output end rotatably supported by and extending outwardly through the mounting bracket (9). The rotational speed detector (14) comprises a rotary portion mounted on the output end of the rotary shaft (4) and a stationary portion mounted to the mounting bracket at the output end of the motor frame (2). The rotational speed detector (14) comprises a substantially elastic permanent magnet plate (20) for generating a magnetic flux ($\phi$) extending through a closed magnetic circuit including contact surfaces which are in pressure contact with the permanent magnet plate (20).

10 Claims, 4 Drawing Sheets

DC MOTOR UNIT WITH A ROTATIONAL SPEED DETECTOR

BACKGROUND OF THE INVENTION

This invention relates to a d.c. motor unit with a rotational speed detector.

A d.c. motor unit for use in a power-assisted steering mechanism for an automobile, for example, has incorporated therein a rotational speed detector. In a previously proposed d.c. motor unit with a rotational speed detector, the rotational speed detector is mounted on an idle end of the d.c. motor which is the end opposite from the output end from which a rotational output is provided. Thus, the arrangement is such that the d.c. motor has a rotary shaft having an elongated idle-end side portion, on which an inducting element is mounted, an induction coil is mounted to an outer end portion of a free-end side bracket, and an outer end of the induction coil is enclosed by a non-magnetic cover which supports at its inner periphery a magnetic path plate having a plurality of teeth at its inner circumference so that they are placed in an opposing relationship with air gaps therebetween. Also, a permanent magnet is pressure-fitted to an inner surface of the magnetic path plate.

When the induction element is rotated by the d.c. motor, magnetic flux generated by the permanent magnet and passing through the magnetic circuit around the induction coil varies, and an varying output power is induced in the induction coil. Therefore, the rotational speed of the d.c. motor can be measured by detecting the frequency of the output by a suitable measuring means.

With the previously proposed d.c. motor unit with a rotational speed detector, since the induction element is mounted on an elongated portion on the idle end of the rotational shaft and the idle-end side bracket is mounted to an end portion of the yoke of the motor, with the stationary portion of the rotational speed detector mounted to an outer end portion of the bracket, the assembly of the motor is complicated and the overall dimension of the motor is large. Also, the water-resisting structure at the motor idle-end side is disadvantageously complicated.

SUMMARY OF THE INVENTION

Accordingly, an object of the present invention is to provide a d.c. motor unit with a rotational speed detector free from the problems discussed above.

Another object of the present invention is to provide a d.c. motor unit with a rotational speed detector having a simple structure and which is easy to manufacture.

Still another object of the present invention is to provide a d.c. motor unit with a rotational speed detector having smaller overall dimensions.

A further object of the present invention is to provide a d.c. motor unit with a rotational speed detector having an improved water-resisting structure.

Another object of the present invention is to provide a d.c. motor unit with a rotational speed detector in which a reliable and stable output characteristic can be obtained.

With the above objects in view, the d.c. motor unit with a rotational speed detector of the present invention comprises a d.c. motor having an output end and an idle end, and a rotational speed detector water-tightly attached to the motor output end. The d.c. motor comprises a motor frame including an output end and an idle end, a mounting bracket attached to the output end of the motor frame and a rotary shaft having an idle end rotatably supported by the motor frame and an output end rotatably supported by and extending outwardly through the mounting bracket. The rotational speed detector comprises a rotary portion mounted on the output end of the rotary shaft and a stationary portion mounted to the mounting bracket at the output end of the motor frame.

The rotational speed detector may comprise a substantially elastic permanent magnet plate or generating a magnetic flux extending through a closed magnetic circuit including contact surfaces which are in pressure contact with the permanent magnet plate.

Alternatively, the d.c. motor may comprise a motor frame having a magnetic yoke portion and an idle-side bracket portion integral with the yoke portion, and an output-side housing water-tightly connected to one end of the motor frame. The rotational speed detector may comprise an induction element connected to an output-side end of a rotary shaft of the d.c. motor and having a plurality of teeth formed on an outer circumference of an outer end and made of a magnetic material, and a magnetic yoke connected to an outer end of the housing and having a substantially U-shaped cross section open in the axial direction. An induction coil wound on a bobbin is disposed within the yoke, and a substantially ring-shaped, elastic permanent magnet plate is disposed at an outer circumferential end face of the yoke through a magnetic back-up plate. A substantially ring-shaped magnetic path member having a plurality of teeth on its inner circumference in a facing relationship with an air gap defined therebetween is disposed on an outer end face of the permanent magnet plate, and a substantially cylindrical non-magnetic cover is connected to the yoke for housing the permanent magnet plate and the back-up plate therein and for supporting the magnetic path member, so that the magnetic path member urges the permanent magnet plate against the end face of the yoke through the magnetic path member.

BRIEF DESCRIPTION OF THE DRAWINGS

The present invention will become more readily apparent from the following detailed description of the preferred embodiments of the present invention taken in conjunction with the accompanying drawings, in which.

motor with a rotational speed detector of a further embodiment of the present invention.

DESCRIPTION OF THE PREFERRED EMBODIMENTS

Figure 1:
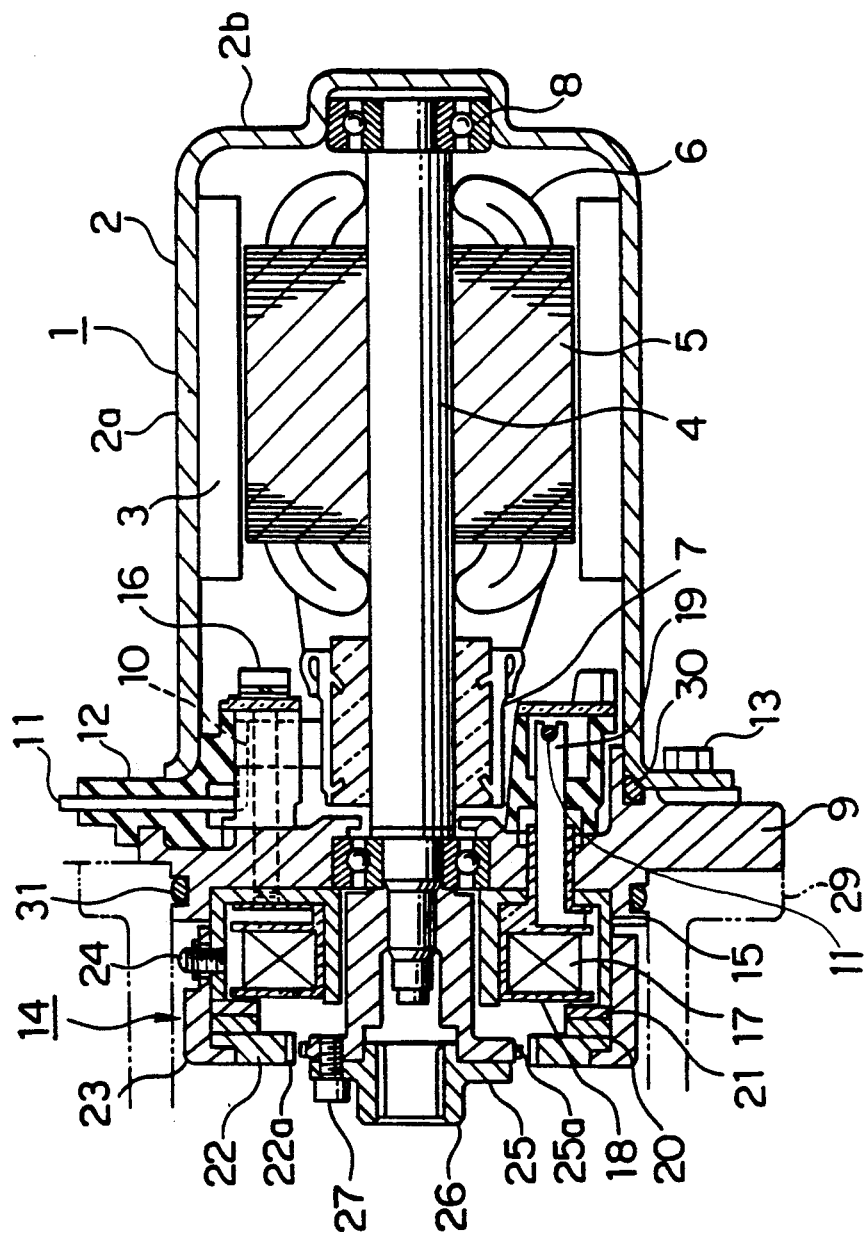
FIG. 1 is a longitudinal sectional view of a d.c. motor unit with a rotational speed detector of one embodiment of the present invention.
Figure 2:
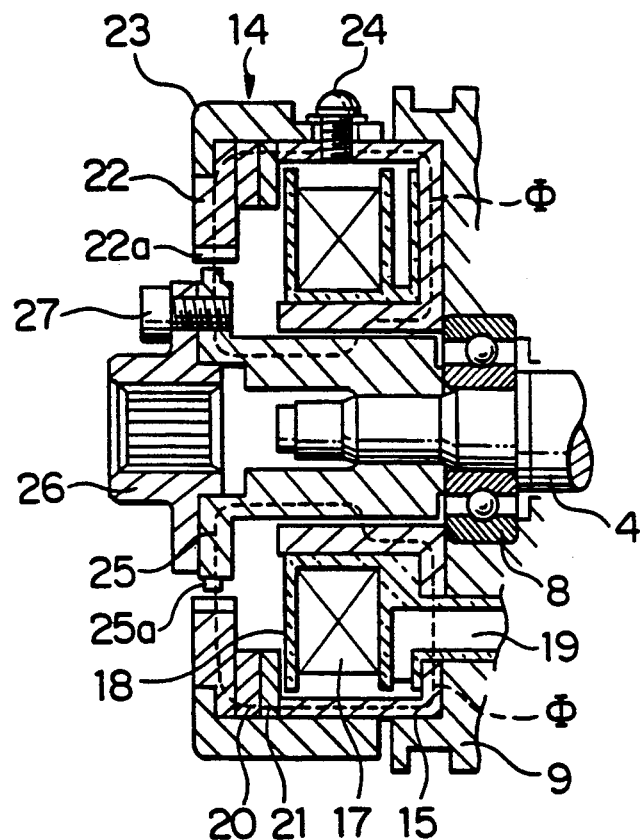
FIG. 2 is an enlarged fragmental sectional view of the rotational speed detector illustrated in FIG. 1.
Figure 3:
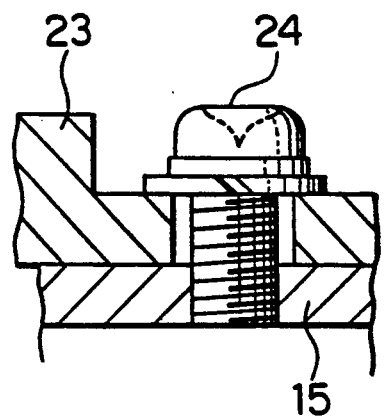
FIG. 3 is an enlarged fragmental sectional view of the joint between the non-magnetic cover and the magnetic yoke.

FIGS. 1 to 3 illustrate a d.c. motor unit with a rotational speed detector of one embodiment of the present invention. The d.c. motor unit with a rotational speed detector comprises a d.c. motor 1 having an output end from which the rotational drive force is provided and an idle or free end from which no power is taken out. The d.c. motor unit with a rotational speed detector further comprises a rotational speed detector 14 connected to the output end of the d.c. motor 1.

The d.c. motor 1 comprises a motor frame member 2 having a magnetic yoke portion 2a and an idle-end side bracket portion 2b integrally connected to each other, a plurality of permanent magnets 3 mounted to the frame member 2, a rotary shaft 4 rotatably supported by bearings 8, an armature core 5 secured to the rotary shaft 4, an armature coil 6 mounted to the armature iron core 5, and a commutator 7 attached to the rotary shaft 4. The d.c. motor 1 also comprises a mounting bracket 9 securely connected to the frame member 2 by means of bolts 13 for mounting the d.c. motor unit to an external load apparatus 29, such as a vehicle steering mechanism, to be driven by the d.c. motor unit. In order to establish a water-tight connection, an O-ring 30 is disposed between the frame member 2 and the mounting bracket 9 and an O-ring 31 is disposed between the mounting bracket 9 and the driven apparatus 29. The mounting bracket 9 has electric brushes 10 mounted thereon so that they are in electrical contact with the commutator 7. The brushes 10 have lead-out conductors 11 extending through a water-tight grommet 12 for connection to an external circuit (not shown).

Connected to the mounting bracket 9 on the output side of the d.c. motor 1 is a rotational speed detector 14 comprising a magnetic yoke 15 having a substantially U-shaped cross section open in the axial direction. The magnetic yoke 15 is secured to the output-side end of the mounting bracket 9 by screws 16. The magnetic yoke 15 holds therein an induction coil 17 wound on a bobbin 18 and having a lead conductor 19 connected to a lead-out conductor 11. As illustrated, a substantially cylindrical non-magnetic cover 23 is securely connected by screws 24 to an outer circumference of the magnetic yoke 15. FIG. 3 illustrates the manner in which the non-magnetic cover 23 is secured to the magnetic yoke 15 by screws 24. The non-magnetic cover 23 has supported on its inner circumferential surface a substantially ring-shaped magnetic back-up plate 21 at the position axially adjacent to the yoke 15 as well as a substantially ring-shaped, elastic permanent magnet plate 20 disposed at the position axially adjacent to the back-up plate 21. Attached to the output-side end of the non-magnetic cover 23 is a substantially ring-shaped magnetic path member 22 urging the permanent magnet plate 20 and the back-up plate 21 against the magnetic yoke 15. The inner circumference of the magnetic path member 22 has formed therein a plurality of teeth 22a. It is also seen that an induction member 25 made of a magnetic material is securely connected to the output end of the rotarty armature shaft 4. The induction member 25 has a plurality of teeth 25a formed along its outer circumference on the radially outwardly extending flange portion of the member 25 in an opposing relationship relative to the teeth 22a. In order to connect the output rotary shaft 4 of the d.c. motor 1 to an external load, a coupling member 26 having formed splines in an inner circumference is connected to the induction member 25 by screws 27. The structure of the rotational speed detector 14 is illustrated in more detail in FIG. 2.

Figure 4:
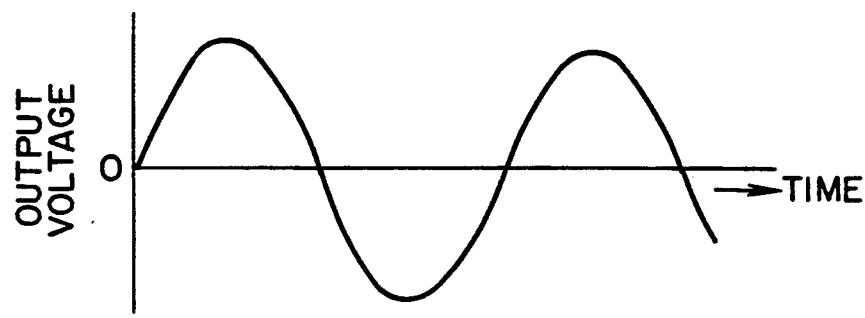
FIG. 4 is a graph showing an output voltage of the induction coil of the speed detector illustrated in FIG. 2.

When the d.c. motor 1 is energized, the rotary shaft 4 rotates, causing the external load apparatus 29 to be rotated through the induction member 25 and the shaft coupling 26. In this condition, a magnetic flux $\phi$ generated by the permanent magnet plate 20 extends through a magnetic path extending through the back-up plate 21, the magnetic yoke 15, the fuelay induction member 25 and the stationary magnetic path member 22 mounted to an outer mounting bracket 9 as illustrated in FIG. 2. As the induction member 25 having the teeth 25a inserted within the magnetic path rotates and the air gap defined between the teeth 25a of the induction member 25 and the teeth 22a of the magnetic path member 22 varies periodically, the magnitude of the magnetic flux $\phi$ extending through the magnetic path varies accordingly, so that an output voltage is induced in the induction coil 17 as illustrated in FIG. 4. The frequency of this output voltage is measured by a suitable measuring means (not shown) to determine the rotational speed of the d.c. motor.

As best illustrated in FIG. 3, the non-magnetic cover 23 has a hole for receiving the screw 24 therein having a diameter larger than that of the screw 24, and the screws 24 are tightened in such a condition that the non-magnetic cover 23 is urged against the permanent magnet plate 20 which in turn is urged against the magnetic yoke 15. With this structure, since the permanent magnet plate 20 is elastic and pressed between the back-up plate 21 and the magnetic path member 22, substantially no air gap is generated between the above members, so that a desired constant number of magnetic fluxes can be generated and a stable output characteristic can be obtained.

Figure 5:
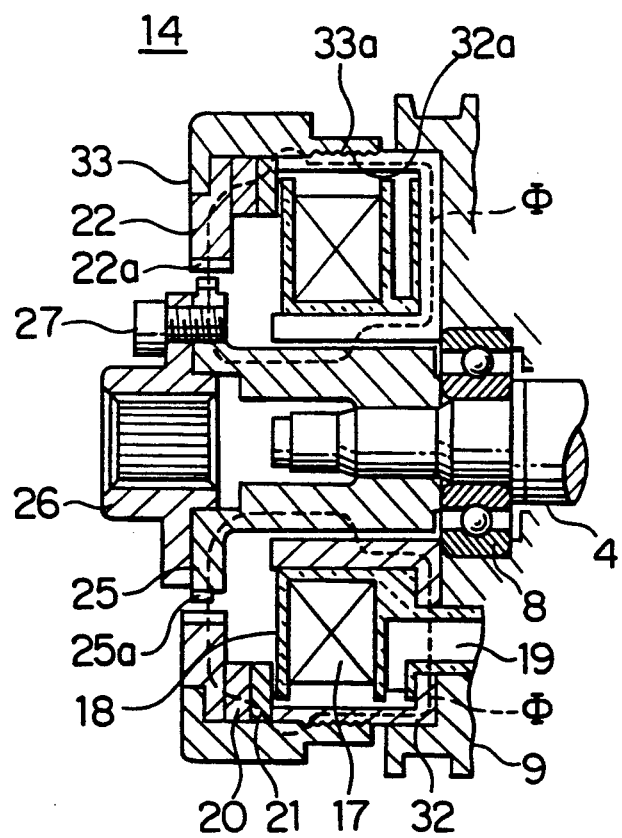
FIG. 5 is an enlarged sectional view similar to FIG. 2 but illustrating another embodiment.
Figure 6:
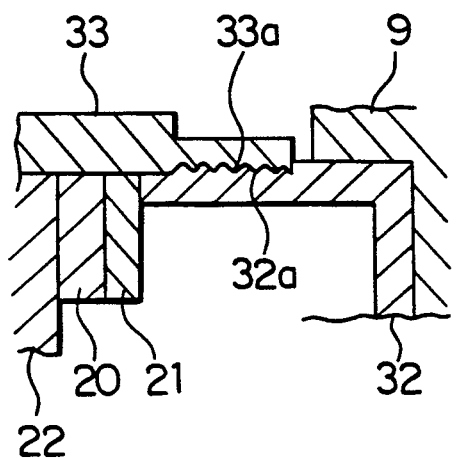
FIG. 6 is a fragmental sectional view of the joint between the non-magnetic cover and the magnetic yoke of the d.c. motor with a rotational speed detector illustrated in FIG. 5.

FIGS. 5 and 6 illustrate another embodiment of the d.c. motor unit with a rotational speed detector of the present invention, in which an inner thread 33a of a non-magnetic cover 33 is thread-engaged to an outer thread 32a of a magnetic yoke 32, whereby the elastic permanent magnet plate 20 can be axially urged against the output-side end of the magnetic yoke 32 through the back-up plate 21, eliminating the generation of the air gap within the magnetic circuit. By measuring the torque with which the non-magnetic cover 33 is tightened onto the magnetic yoke 32, the pressure acting on the permanent magnet plate 20 can be suitably adjusted.

Figure 7:
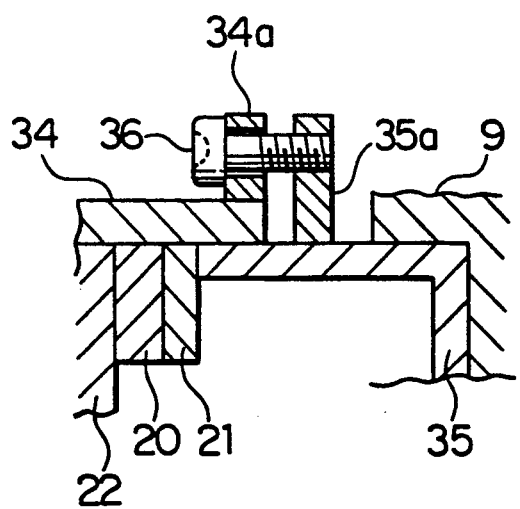
FIG. 7 is a fragmental sectional view ol the joint between the cover and the magnetic yoke of the d.c.

FIG. 7 illustrates a further embodiment of the d.c. motor unit with a rotational speed detector of the present invention, in which a non-magnetic cover 34 is provided with an outwardly extending flange 34a along its open end and a magnetic yoke 35 is provided with an outwardly extending flange 35a at its outer circumference so that the flanges 34a and 35a face each other. The flanges 34a and 35a and therefore the non-magnetic cover 34 and the magnetic yoke 35 are fastened together by a plurality of screws 36 extending between the two flanges 34a and 35a. This embodiment is also useful in relatively precisely adjusting the pressure on the permanent magnet plate 20.

As has been described, according to the d.c. motor unit with a rotational speed detector of the present invention, the induction member is mounted on the output-side end of the motor shaft and the stationary portion of the rotational speed detector is mounted to the mounting bracket positioned at the output side of the motor. Therefore, the manufacture of the motor unit is facilitated, the overall dimension of the d.c. motor unit can be small and the watertight structure can be simple because the rotational speed detector, when assembled to a driven unit, is inside of the driven unit. Also, a reliable, proper magnetic flux can be easily obtained.

What is claimed is:

1. A d.c. motor unit with a rotational speed detector, comprising:
    said d.c. motor unit (1) having a motor frame (2) including an output end and an idle end, a mounting bracket (9) attached to said output end of said motor frame (2) and a rotary shaft (4), said rotary shaft having an idle end rotatably supported by said motor frame (2) and an output end rotatably supported by and extending outwardly through said mounting bracket (9); and
    said rotational speed detector (14) having a rotary portion mounted on said output end of said rotary shaft (4), and a stationary portion cooperable with said rotary portion and mounted to an outer side of said mounting bracket at the output end of said motor frame (2).

2. A d.c. motor unit as claimed in claim 1 wherein a water-tight structure is disposed between said motor frame (2) and said mounting bracket (9).

3. A d.c. motor unit as claimed in claim 1, wherein said rotational speed detector (14) comprises:
    a substantially elastic permanent magnet plate (20) for generating a magnetic flux ($\phi$):
    a closed magnetic circuit for allowing said magnetic flux to pass therethrough, said magnetic circuit including contact surfaces in contact with said permanent magnet plate (20);
    means (22a, 25a) inserted within said magnetic circuit for varying magnetic reluctance thereof in response to a rotation of said rotary shaft,
    a pick-up coil (17) disposed in an electromagnetic inductive relationship with said magnetic circuit ($\phi$) for detecting a frequency of change of said magnetic reluctance of said magnetic circuit and for providing an output signal indicative of a rotational speed of said rotary shaft; and
    holder means for establishing a pressure contact relationship between said elastic permanent magnet plate (20) and said contact surfaces of said magnetic circuit.

4. A d.c. motor unit as claimed in claim 3, wherein said holder means comprises a non-magnetic cover (23) axially movable relative to said magnetic circuit and fastener means for securing said said non-magnetic cover (23) to said magnetic circuit, said non-magnetic cover (23) causing said elastic permanent magnet (20) to be compressed in said magnetic circuit to provide large and stable pressure contact surfaces between said permanent magnet (20) and said contact surfaces of said magnetic circuit.

5. A d.c. motor unit as claimed in claim 4, wherein said magnetic circuit comprises a magnetic yoke (15), and said non-magnetic cover (23) is adjustably connected to said magnetic yoke (15).

6. A d.c. motor unit as claimed in claim 5, wherein said non-magnetic cover (23) is axially slidable relative to said magnetic yoke (15), and said fastener means comprises a screw (24,36) fastening said non-magnetic cover (23) to said magnetic yoke (15).

7. A d.c. motor unit as claimed in claim 6, wherein said screw extends in a radial direction through said non-magnetic cover (23) and said magnetic yoke (15).

8. A d.c. motor unit as claimed in claim 6, wherein said non-magnetic cover (23) and said magnetic yoke (15) have radially outwardly extending fastener plates (34a, 35a, and said screw (36) extends in an axial direction through said fastener plates.

9. A d.c. motor unit as claimed in claim 5, wherein said fastener means comprises a thread (33a) on said non-magnetic cover and a mating thread (32a) on said magnetic yoke.

10. A d.c. motor unit with a rotational speed detector, comprising;
    said d.c. motor unit (1) having an output side and an idle side and said rotational speed detector (14) being disposed at said output side of said d.c. motor unit (1);
    said d.c. motor unit (1) comprising;
    a motor frame (2) having a magnetic yoke portion (2a) and an idle-side bracket portion (2b) integral with said yoke portion; and
    a mounting bracket (9) water-tightly connected to one end of said motor frame yoke portion (2a); and
    said rotational speed detector (14) comprising;
    an induction element (25) connected to an output-side end of a rotary shaft (4) of said d.c. motor unit (1) and having a plurality of teeth (25a) formed on an outer circumference of an outer end and made of a magnetic material;
    a magnetic yoke (15) connected to an outer end of said mounting bracket (14) and having a substantially U-shaped cross section open in an axial direction;
    an induction coil (17) wound on a substantially ring-shaped bobbin (18) disposed within said yoke (15):
    elastic permanent magnet plate (20) disposed at an outer circumferential end face of said yoke (15) through a magnetic back-up plate (21);
    a substantially ring-shaped magnetic path member (22) having a plurality of teeth (22a) on its inner circumference in a facing relationship with an air gap defined therebetween disposed on an outer end face of said permanent magnet plate (20); and
    a substantially cylindrical non-magnetic cover (23) connected to said yoke (15) for housing said permanent magnet plate (20) and said back-up plate (21) therein and for supporting said magnetic path member (22), so that said magnetic path member urges said permanent magnet plate (20) against said end face of said yoke (15) through said magnetic path member (22).

* * * * *